United States Patent [19]

Thompson et al.

[11] Patent Number: 5,088,621
[45] Date of Patent: Feb. 18, 1992

[54] BULK DISPENSING APPARATUS SYSTEM

[76] Inventors: Bruce Thompson; Randall B. Thompson, both of Box 823, Stouffville, Ont., Canada, L4A 7Z9

[21] Appl. No.: 520,895

[22] Filed: May 8, 1990

Related U.S. Application Data

[63] Continuation-in-part of Ser. No. 216,105, Jul. 7, 1988, abandoned.

[30] Foreign Application Priority Data

Jul. 10, 1987 [CA] Canada .................................. 541812

[51] Int. Cl.$^5$ .............................................. B67D 5/30
[52] U.S. Cl. ............................................... 222/1; 222/21; 222/23; 222/65; 222/66; 222/130; 222/255; 222/333; 222/385
[58] Field of Search ................. 222/1, 21, 23, 64, 66, 222/65, 74, 75, 71, 129, 130, 255, 278, 320, 321, 333, 372, 385, 14, 15, 16, 32, 33, 52, 56, 63, 67, 68; 137/571, 575, 566, 386, 389-391, 395, 396, 551; 141/94, 198, 206, 208, 209

[56] References Cited

U.S. PATENT DOCUMENTS

| | | |
|---|---|---|
| Re. 15,257 | 1/1922 | Beach . |
| 598,035 | 1/1898 | Towle . |
| 1,262,595 | 4/1918 | Bashore . |
| 1,346,898 | 7/1920 | Kingsbury .................. 222/64 X |
| 1,352,820 | 9/1920 | McKallip . |
| 1,408,739 | 3/1922 | Hull . |
| 1,455,742 | 5/1923 | Bates .................. 222/64 X |
| 1,882,583 | 10/1932 | Haupt . |
| 2,001,025 | 5/1935 | Jamieson . |
| 2,049,405 | 7/1936 | Brake .................. 222/255 X |
| 2,286,476 | 6/1942 | Eickmeyer .................. 222/71 |
| 2,506,240 | 5/1950 | Sekkel .................. 222/21 |
| 2,669,941 | 2/1954 | Stafford .................. 222/66 X |
| 3,024,945 | 3/1962 | Erickson .................. 222/33 |
| 3,109,559 | 11/1963 | Wilburn .................. 222/14 X |
| 3,291,342 | 12/1966 | Mankin .................. 222/385 X |

Primary Examiner—David H. Bollinger
Attorney, Agent, or Firm—McFadden, Fincham, Marcus & Anissimoff

[57] ABSTRACT

A dispensing apparatus for bulk fluids, and a method associated therewith, is disclosed in which a bulk storage tank operates in association with a second tank of a smaller size, and which retains a fluid to be dispensed in a self-serve operation. Preferably, separate pumps are employed for feeding liquid from the bulk tank to the smaller reservoir, and from the reservoir through a nozzle to a receptacle, on demand. The apparatus of the present invention provides a system for dispensing fluids such as windshield washer at e.g., service stations, which can be used by a customer when it is desired to re-fill a vehicle windshield washer, without the problems associated with filling using larger containers.

28 Claims, 2 Drawing Sheets

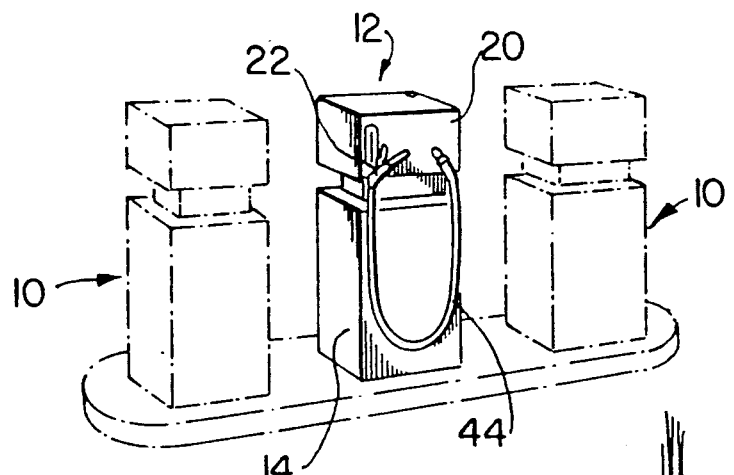
FIG. 1
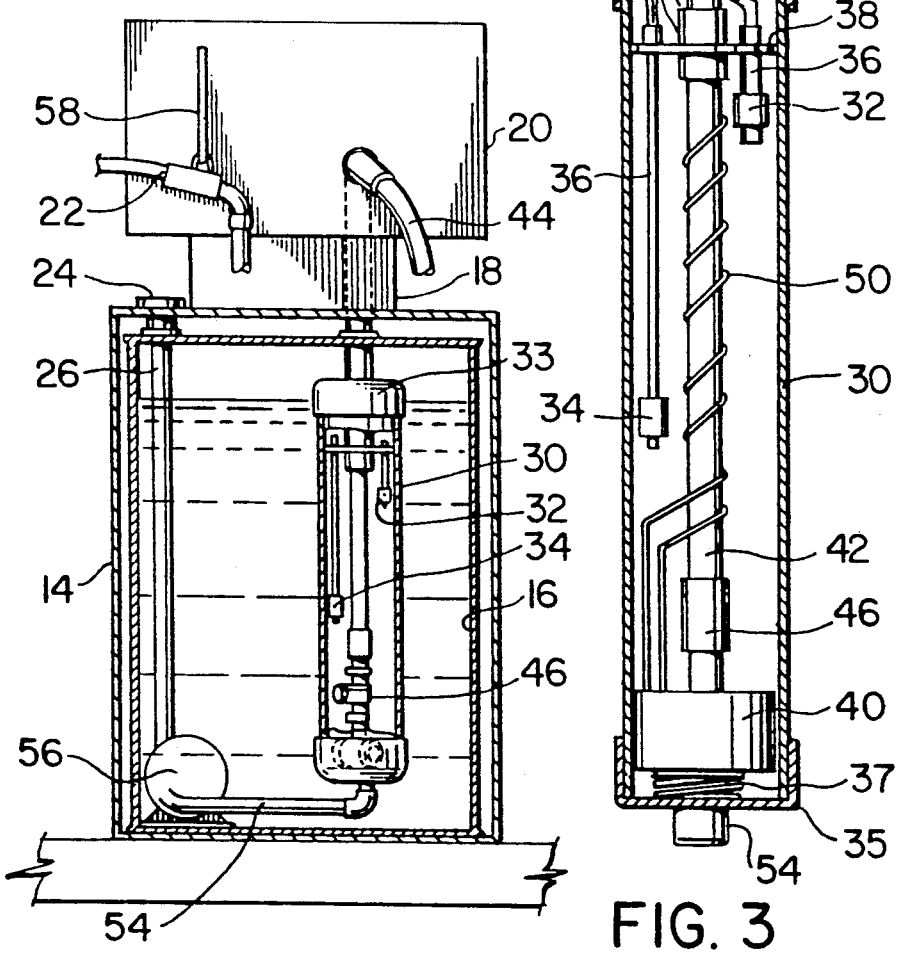
FIG. 2
FIG. 3

BULK DISPENSING APPARATUS SYSTEM

This Application is a Continuation-In-Part of Application Ser. No. 216,105 filed July 7, 1988.

BACKGROUND OF THE INVENTION

1. Field of the Invention

This invention relates to the dispensing of bulk fluids. More particularly, one aspect of this invention relates to an apparatus for dispensing determined quantities of fluids from a bulk source thereof; another aspect of this invention relates to a method of dispensing determined quantities of fluid, as described hereinafter in greater detail.

2. Description of the Prior Art

The prior art teaches various types of equipment and methods for the dispensing of bulk fluid. In most cases, such prior art is directed to the dispensing of metered quantities of liquids (as opposed to determined amounts), where variable quantities of such liquids are required. For example, gasoline is required to be dispensed from a bulk source to an automobile via a gas pump dispensing device, in which it is required to meter the quantity of gasoline being dispensed in order to charge correctly for the amount of gasoline actually being dispensed. Such equipment requires precise metering pumps and, in many cases, the metered quantity is taken directly from the bulk reservoir or tank to be directly used, passing through a metering device.

Other arrangements for dispensing metered quantities of fluid are also known; likewise, certain arrangements are shown in the prior art for dispensing non-metered but predetermined or fixed quantities of liquids from a bulk source. Typical of these is U.S. Pat. No. 598,035 which illustrates a dual reservoir system for filling bottles with a liquid; the dual reservoirs empty into a single discharge system. This reference also discloses a single reservoir arrangement (FIG. 2). Metering of the fluid is achieved by use of a plunger which regulates the size of the volume in the chamber while fluid from a bulk source is admitted via a valve at the bottom of the device. Fluid is fed by gravity with the desired amount being fed-in by regulating a float valve.

U.S. Pat. No. 1,262,595 also illustrates a dual system but in this case, a lever arrangement regulates the amount of fluid into and out of the individual reservoirs. Float 38 is used to control the height, and thus the volume of the liquid being introduced into the individual reservoirs. Discharge of the fluid from the reservoirs is achieved through an indirect manner.

U.S. Pat. No. 1,352,820 discloses a pump for dispensing bulk fluid into individual reservoirs; this arrangement is fairly complex and would not appear to be capable of metering predetermined amounts of fluid utilizing the reservoir as a source for dispensing fluids for an "island" type arrangement.

U.S. Pat. No. 1,408,739 is a reference dealing with an older type of gas dispensing apparatus, which utilizes a reservoir on top of a storage tank or the like. There is no capability of dispensing predetermined or fixed amounts from the reservoir but rather, the gas appears to be dispensed upon demand for a metering type of operation.

U.S. Pat. No. 1,455,742 discloses a liquid vending machine in which a source of bulk fluid is connected via a conduit to a pump, from the pump to a further conduit into a reservoir. To actuate the pump, a float type arrangement is employed which varies with the level of the fluid in the reservoir.

U.S. Pat. No. Reissue 15,257 is again an older style of gasoline pump, and employs a rotatable plug 31 as described in that reference for the purpose of dispensing the fluid. A very complicated system is illustrated in U.S Pat. No. 1,882,583 utilizing dual reservoirs with a reciprocating pump. A similar arrangement is illustrated in U.S. Pat. No. 2,001,025.

Although various bulk fluids have been dispensed directly and indirectly from the bulk source, over the years, in products such as gasoline, it is essential to accurately and correctly meter the amounts involved. Such devices tend to employ expensive metering valves and for many applications, this is not required. Likewise, in the case of certain fluids, it would be more appropriate to dispense predetermined amounts, rather than variable metered amounts.

Dispensing of bulk liquids as opposed to the sale of such liquids in individual containers, has several advantages. First, transportation and handling costs are greatly reduced if one is able to dispense the bulk liquids directly at their point of use, as opposed to packaging and retailing smaller quantities of the same liquid. A case in point is windshield washer fluid which, under conventional practice, is normally sold to the consuming public in one gallon or four litre containers, and the individual user must then fill the vehicle reservoir from such containers. This has the disadvantage that normally, such containers do not have a pouring spout, with the result that spillage/wastage of the fluid is encountered.

It would, therefore, be advantageous if a dispensing apparatus and method for dispensing bulk fluids such as windshield washer fluid, can be provided for, in which the wastage/spillage normally encountered in a consumer emptying a one gallon or four litre container of the windshield washer fluid into a vehicle, can be eliminated but at the same time, providing for a convenience source which would be readily available to consumers of such fluids from a central point.

Accordingly, the invention will be described with particular reference to the dispensing of windshield washing fluid, although it is understood that other liquids in a similar category can likewise be advantageously dispensed according to the method of the present invention using the apparatus described herein.

BRIEF SUMMARY OF THE INVENTION

With respect to the apparatus and method in the present invention, one form of one embodiment is a liquid dispensing apparatus or system for dispensing a determined amount of fluid, such as a windshield washer fluid, from a bulk source thereof, and comprises in overall form, a bulk tank suitable for holding a bulk liquid, a smaller reservoir adapted to retain a predetermined quantity of the liquid, and in one embodiment, the reservoir having pump means therein adapted to dispense a determined quantity of liquid through the pump means, a dispensing outlet operatively associated with the reservoir for dispensing the determined quantity of liquid, inlet means operatively associated with the reservoir for receiving a supply of the liquid from the bulk tank, and pump means associated with a bulk tank for feeding the supply of liquid to the reservoir from the bulk tank, and control means within the reservoir for actuating the pump means associated with the bulk tank for filling the reservoir when the reservoir is empty, and for disengaging the pump means associated with the bulk tank when the reservoir is filled to a predetermined level.

In another embodiment, there is provided a self-contained liquid dispensing apparatus comprising a housing; a bulk tank in the housing for holding a bulk supply of liquid; a reservoir mounted on the housing for holding a smaller supply of liquid; a first pump in the housing for filling the reservoir from the bulk tank; a second pump in the housing for pumping liquid from the reservoir to a dispensing outlet; liquid level sensing means associated with the reservoir and including an upper sensing means and a lower sensing means for sensing a higher and a lower liquid level in the reservoir; and control means for actuating the first and second pumps; the lower and the upper sensing means respectively providing signals to the control means to actuate the first pump to fill the reservoir when the liquid level is at the lower liquid level and to permit actuation of the second pump for dispensing of the liquid to the dispensing outlet after filling of the reservoir.

In a preferred form of the above apparatus, the dispensing outlet is operatively associated with a nozzle means for dispensing the determined quantity of liquid held by the reservoir into, e.g., a vehicle receptacle for windshield washer fluid; such nozzle or the like may include on/off means to prevent the flow of fluid from the reservoir; likewise, a dispensing outlet or the nozzle can include means for actuating the pump means associated with the reservoir where the pump means of the reservoir and the pump means of the bulk tank are actuated in a separate manner.

In another embodiment of the present invention, there is provided second control means for overall control of both of the pump means, the second control means being actuatable when the nozzle means is moved from a first, non-dispensing position to a second, dispensing position.

In yet another embodiment, the control means within the reservoir is adjustable to vary the amount of fluid in the reservoir.

In a still further embodiment, there is included a second control means for sequential operation of the pumps, and also included are coin-operated means for actuating the second control means. In a further embodiment, the coin-operated means are associated with the control means for dispensing a quantity of liquid determined by the coin-operated means.

In a still further embodiment, the coinoperated means have a preset coin value actuating level for dispensing a predetermined quantity of liquid. In yet another embodiment, the coin-operated means have a variable coin value level, the coin-operated means being adapted to shut off the control means when a quantity of liquid determined by an inserted coin value has been dispensed.

In yet another embodiment, the dispensing outlet comprises a nozzle.

In a still further embodiment, there is provided a liquid quantity indicator for indicating the quantity of liquid dispensed. In another embodiment, the apparatus includes a liquid value indicator for indicating the value of liquid dispensed, and in an alternate form of this embodiment, there is also provided a liquid quantity indicator for indicating the quantity of liquid dispensed.

In another form of one embodiment, the nozzle means includes shut off means.

Another form of a still further embodiment of the present invention is a liquid dispensing apparatus comprising a bulk tank for holding a bulk supply of liquid; a reservoir for holding a smaller supply of liquid; pump means for filling the reservoir from the bulk tank; further pump means for pumping liquid from the reservoir to a dispensing outlet; liquid level sensing means associated with the reservoir and including an upper sensing means and a lower sensing means for sensing a higher and a lower liquid level in the reservoir; control means for actuating the pumps; the lower and the upper sensing means respectively providing signals to the control means to fill the reservoir when the liquid level is at the lower liquid level and to cease filling the reservoir when the liquid level is at the upper liquid level, the control means also permitting dispensing of the liquid to the dispensing outlet after filling of the reservoir; and switch means connected to the control means for bypassing the lower sensing means to enable the pump means to re-fill the reservoir when the quantity of liquid dispensed does not lower the liquid level to the lower liquid level.

In a still further embodiment, the switch means comprises a manually operated switch means, and in another embodiment, the switch means is actuated by the return of the nozzle means to a shut off position.

A still further form of another embodiment of the present invention is a liquid dispensing apparatus comprising a bulk tank for holding a bulk supply of liquid; a reservoir positioned on the bulk tank for holding a smaller supply of liquid; first pump means for filling the reservoir from the bulk tank; second pump means for pumping liquid from the reservoir to a dispensing outlet; liquid level sensing means associated with the reservoir and including an upper sensing means and a lower sensing means for sensing a higher and a lower liquid level in the reservoir; control means for actuating the first and second pump means; the lower and the upper sensing means respectively providing signals to the control means to actuate the first pump means to fill the reservoir when the liquid level is at the lower liquid level and to actuate the second pump means to cease filling the reservoir when the liquid level is at the upper liquid level, the control means permitting actuation of the second pump means for dispensing of liquid to the dispensing outlet after filling of the reservoir.

Another form of yet another embodiment of the present invention is a liquid dispensing apparatus comprising a bulk tank for holding a bulk supply of liquid; a reservoir positioned on the bulk tank for holding a smaller supply of liquid; first pump means in the bulk tank for filling the reservoir from the bulk tank; second pump means positioned in the reservoir for pumping liquid from the reservoir to a dispensing outlet; liquid level sensing means associated with the reservoir and including an upper sensing means and a lower sensing means for sensing a higher and a lower liquid level in the reservoir; control means for actuating the first and second pump means; the lower and the upper sensing means respectively providing signals to the control means to actuate the first pump means to fill the reservoir when the liquid level is at the lower liquid level and to actuate the second pump means to cease filling the reservoir when the liquid level is at the upper liquid level, the control means permitting actuation of the second pump means for dispensing of liquid to the dispensing outlet after filling of the reservoir.

In accordance with a further aspect of this invention, there is also provided a method of dispensing bulk fluids, such as windshield washer fluid, from a bulk source thereof into, e.g., a vehicle's windshield washer reservoir, which method in one embodiment includes the steps of: (a) providing a bulk source of a fluid such as windshield washer fluid, (b) providing a smaller reservoir for retaining a predetermined quantity of fluid to be dispensed on demand, (c) filling the reservoir with fluid from the bulk source, (d) controlling the volume of fluid fed to the reservoir to a predetermined quantity, by detecting at a fixed point in the reservoir the level of fluid therein to thereby cause the cessation of step (c), (e) dispensing, on demand, a determined quantity of fluid from the reservoir, (f) indicating the termination of the dispensing of the fluid of step (e), and (g) generating a signal to repeat step (c) after step (e) has been completed. Termination of dispensing of the fluid can be when the fluid falls to a preset lower level, or at some intermediate level.

In accordance with a still further aspect of this invention, there is also provided a method of dispensing bulk liquid from a bulk source thereof, which method in another embodiment includes the steps of: (a) pumping a liquid from a bulk storage by a first pump mounted in the bulk storage to a reservoir mounted on the bulk storage for holding a smaller supply of liquid; (b) feeding liquid from the reservoir by a second pump mounted in the reservoir; (c) initiating the pumping by the first pump by detection of a liquid level at a lower level and shutting off the pumping by the first pump by detection of the liquid level at an upper level, and actuating the second pump to pump liquid from the reservoir to an outlet, after filling the reservoir.

In another embodiment, the method further includes the step of dispensing liquid through a nozzle. In a still further embodiment, the method further includes the step of selecting a determined quantity of liquid by inserting one or more coins in a coin mechanism.

In yet another embodiment, the method further includes the step of indicating the quantity of liquid dispensed. In a still further embodiment, the method includes the step of indicating the value of liquid dispensed.

The apparatus and method of the present invention are particularly useful for dispensing a bulk fluid at gas stations or other facilities used by motorists. Thus, for example, gas stations can provide a storage facility for a bulk fluid, which in the case of windshield washer, may be provided in 45 gallon drums or the like and by using the apparatus and method of the present invention, correct dispensing of fluids such as windshield washer can be achieved without the problems associated with the individual use of one gallon or the like containers (e.g., the problem of spilling/wasting from pouring can be totally eliminated).

The apparatus of the present invention can be constructed so as to be retained in a self-serving operation; for example, a 45 gallon drum may be contained within a housing, which likewise contains the smaller reservoir together with all of its associated components, and a dispensing nozzle can be provided which is in communication with the reservoir to permit a service station attendant, or the individual motorist, to dispense the determined quantity of fluid. Since the apparatus of the present invention does not involve an expensive metering system, the construction of such an installation will be economical.

To provide the apparatus of the present invention, two separate pump means are employed - a first pump means to provide liquid from the bulk source to the reservoir, and the second pump means, operating independently of the first pump means, for providing a flow of liquid from the reservoir to, e.g., a vehicle's windshield washer reservoir. The pump means employed for this purpose can be of any suitable type of pump, preferably electrically driven, each pump means operating in conjunction with the other and in a desired sequence. Typical of the pumps which may be employed are gear pumps, submersible pumps, etc. In a preferred embodiment, the pump means for the reservoir is located internally of the reservoir in order to provide an advantageous arrangement, wherein the reservoir may also be partially or totally mounted within the bulk source or tank in order to provide a compact arrangement of the system of the present invention. Likewise, the pump means for feeding liquid from the bulk source to the smaller reservoir can be any conventional pump for this purpose, such as those described above, and may be mounted internally or externally of the bulk tank.

It is a feature of the present invention, in its most preferred form, that two separate pump means are employed in the apparatus, which eliminates the need for metering devices commonly encountered in prior art arrangements for dispensing bulk fluids. Each of the pump means functions for a different purpose, and although both pump means operate in a desired sequence, such pump means do not operate together, thereby avoiding the possibility of accidental discharge of fluid while at the same time, providing only the desired determined quantity of fluid.

The reservoir which contains a predetermined quantity of fluid can be provided for by using preferably closed containers of different sizes or shapes; typically, such a container will be a closed system, but in most cases, non-pressurized. The smaller reservoir, when used in the case of dispensing windshield washer fluid, will typically have a volume of, e.g., four litres, but utilizing the control system of the present invention, the reservoir can actually be adapted to dispense determined amounts in values ranging up to four litres from the same reservoir. Since the fluid is dispensed under pressure from the smaller reservoir, by its associated pump means, the reservoir can be mounted at any desired location in a downstream direction from a bulk source and its associated pump means. As noted above, one particular arrangement involves the use of a smaller reservoir mounted within the larger bulk source in order to provide a compact assembly. When the smaller reservoir is mounted within the bulk storage component, the smaller reservoir should be totally sealed so as to prevent leakage from the bulk source into the smaller reservoir. Thus, enclosed self-contained reservoirs are preferred.

The pump means associated with a small reservoir can be mounted directly therein for the sake of providing a compact and efficient unit. Typically, the pump may be located at the bottom of the reservoir for ease of operation; in an alternate embodiment, the pump for the reservoir may be located externally of the reservoir and connected thereto by means of a conduit.

The pump of the reservoir is connected to the dispensing outlet for the reservoir, normally by appropriate conduits. In a typical installation, the pump will be connected to a dispensing outlet which terminates in a nozzle or the like, preferably provided with an on/off valve. Thus, actuation of the pump means for the reservoir will not necessarily dispense fluid until such time as the nozzle, with the on/off valve means, is open to permit flow of fluid.

The system is preferably provided with control means to control the sequential operation of the pumps; such control means are effective to discontinue feeding of fluid contained in the reservoir when the reservoir is empty and at the same time, to sequentially activate the pump means associated with the bulk storage means to refill the reservoir. A particularly preferred control means operates in conjunction with the first and second detecting means contained within the reservoir, according to a further feature of the present invention. Thus, the reservoir is provided with a first detecting means located at a fixed point in the reservoir to detect a first fluid level in the reservoir; a second detecting means, again mounted at a fixed point which is spaced from the first detecting means, is effective to detect a second fluid level (such as a lower fluid level) in the reservoir. Thus, the reservoirs used in accordance with this invention have a first and second detecting means and function with the overall control means to actuate the pump means of the bulk storage component to fill the reservoir on demand when the fluid level has reached the second detecting means.

Likewise, the first detecting means, which is fixed at a point spaced from the second detecting means, as, e.g., in a higher location within the reservoir, is effective to terminate the operation of the pump means associated with the bulk storage of the liquid so that the liquid, when pumped into the smaller reservoir, fills the reservoir only to a predetermined and fixed volume or level.

The detecting means which are employed within the smaller reservoir can be suitably magnetic detecting means capable of being submersed into liquid; both detecting means may be the same or may be different types of detecting means, and the choice of any particular detecting means such as magnetic contacts or the like, can be selected as known to those skilled in that art.

If desired, the upper detecting means may also be employed for the purpose of generating a signal to a master control for initiating a "fill" sequence to permit the dispensing of determined quantities of liquid from the small reservoir to a vehicle's windshield washer reservoir. Alternately, in the assembly, if a nozzle with an on/off valve is employed, appropriate means connected to the nozzle or on/off valve thereof could be used to actuate the pump means of the small reservoir — i.e., to generate a signal to actuate the pump means when the user is ready to dispense the predetermined quantity on demand. In a similar manner, the detector switch, which is used to actuate the pump means of the bulk storage system, may likewise be used to generate a signal to accommodate the pumping action of the pump delivering the quantity of fluid from the reservoir; using a master control means, sequence of terminating the feeding of a fluid by the pump associated with the reservoir and the start-up of the pump associated with the bulk system can be separated in a time-cycle or, still further, additional control means may be inserted, requiring resetting of the cycle before the pump means of the bulk system is actuated to re-fill the reservoir.

When, as in one embodiment of the invention, the customer dispenses only a portion of the volume in the reservoir, means are provided, such as a manual push-button or actuated by replacement of a nozzle, for causing the pump associated with the bulk system to fill the reservoir.

All of the control means, apart from the detecting means, can be provided by suitable relay and timing circuits; again, those skilled in that art can appropriately select such relays and circuitry for that purpose.

While the above and subsequent description refer specifically to the dispensing of bulk windshield washer fluid, the apparatus and method of the present invention may be employed for dispensing other bulk fluids such as, e.g., kerosene, soap solutions or the like. Accordingly, it will be understood that other uses of the equipment and methods described herein will become readily apparent to those skilled in this art.

BRIEF DESCRIPTION OF THE DRAWINGS

Having thus generally described the invention, reference will now be made to the accompanying drawings, illustrating preferred embodiments, and in which:

FIG. 1 is a perspective schematic view of a typical service station "island" which incorporates the apparatus of the present invention;

FIG. 2 is a vertical section taken through the apparatus shown in FIG. 1;

FIG. 3 is an enlarged, sectional view of a reservoir used in the present invention;

DETAILED DESCRIPTION OF PREFERRED EMBODIMENTS

Figure 4:
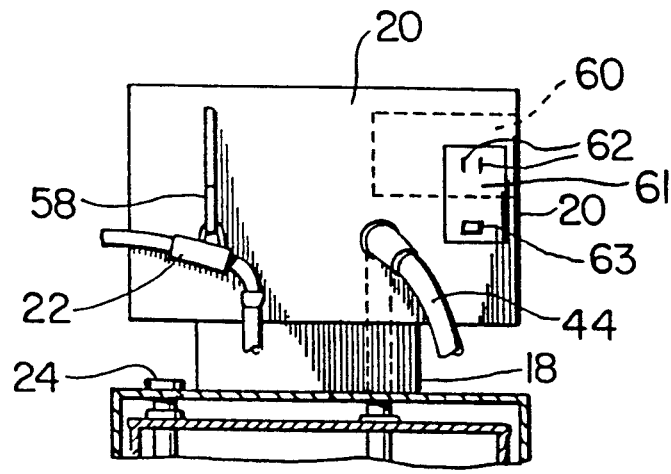
FIG. 4 is a front view of the upper housing of the apparatus shown in FIG. 2, illustrating a modification thereof.

Referring initially to FIGS. 1 and 2, a typical service station "island" is illustrated, in which gas pumps 10 are generally provided; an apparatus according to this invention is indicated generally by reference numeral 12 and includes a housing 14 adapted to retain a source of bulk fluid which, in this case, may be typically, e.g., a 45 gallon drum 16. The housing 14 communicates through an intermediate housing 18 to an upper housing 20; the upper housing may mount a source of power (e.g., a battery or the like) together with any control circuitry desired. The upper housing also serves to mount a dispensing nozzle 22, described hereinafter in greater detail.

The bulk storage tank 16 includes means to permit filling of the tank; to this end, an opening with a cap 24 is provided, in communication with the bulk storage tank through conduit 26. Thus, the bulk tank can be re-filled as desired.

Mounted within the bulk storage tank is a reservoir of a smaller volume, e.g., one or several litres, indicated generally by reference numeral 30. Reservoir 30 is provided with a pair of magnetic switches 32 and 34, which are suspended at a predetermined distance from each other by corresponding mounting rods 36 which are joined by a supporting means 38 to the reservoir 30. The magnetic contact switches 32 and 34 determine the on/off cycle of the pump means as described in greater detail hereinafter. Reservoir 30 is provided with the pump 40, which in the illustrated embodiment is located within the reservoir. The pump 40, when activated, is effective to withdraw liquid from the reservoir 30 and dispense the same through a conduit 42, which in turn, is in communication with a flexible hose 44 accommodating a nozzle 22. Check valve 46 may be provided in conduit 42 to prevent back-flow of fluid into the reservoir.

The reservoir 30 is provided with a cover 33, through which the conduit 42 passes; a further aperture in the cover 33 may be provided for the passage of a conduit 48 carrying electrical control panels, e.g., wires 50 which are connected to appropriate relays of a power source for activation of the motor/switches.

If desired, a spring 37 may be provided between the bottom 35 of the reservoir 30 and the pump motor 40 in order to cushion or dampen any vibrations.

Reservoir 30 is in communication with the bulk reservoir or storage tank 16 through a conduit 54, which in turn, feeds bulk fluid into the reservoir 30 via a pump 56 which is located within the tank 16.

By varying the heights between magnetic contact switches 32 and 34, the volume of fluid to be dispensed can be selected as desired; use of magnetic contact switches 32 and 34 will always dispense a predetermined quantity corresponding to the difference in mounting of the two switches. In this respect, the switches 32 and 34 can be adjusted and mounted on support members 36 by, e.g., extending the support members 36 and securing the switches 32 and 34 in an adjustable manner thereon.

In operation, nozzle 22 is used for filling the windshield washer reservoir of an automobile; this nozzle 22 may have on/off valve means (not shown) associated therewith, and may be mounted on a hook-shaped lever 58. Lever 58 may be connected to a conventional switch means located in the upper housing 20, so that upon removal of the nozzle 22 from the lever 58, such conventional switch means are actuated to activate the pump 40. Upon a trigger or on/off valve means being actuated on the nozzle 22, the pump 40 will then commence pumping windshield washer fluid from the reservoir 30 through conduit 42, hose 44 and nozzle 22. An overriding relay of conventional design may be employed for the purpose of permitting the pump 40 to be actuated, which is tied in with the magnetic contact switch 32 which signals to a control system that there is fluid in the reservoir 30. Control switch 34 may likewise be tied into a conventional relay so that upon the pump 40 dispensing a determined quantity (that level between the switch 32 and the switch 34), switch 34 will be effective to terminate the pumping operation through the pump 40 and at the same time, signal to the control system the activation of pump 56 to commence the re-filling of the reservoir 30 from the bulk storage tank 16. Filling is then continued until the level of the liquid in the reservoir 30 makes contact with the switch 32, which is then effective through a conventional relay or the like to terminate the pumping operation using pump 56.

One modification of the above-described apparatus includes the provision of coin-operated dispensing means where, e.g., a conventional coinreceiving mechanism may be employed in conjunction with an overall control means to activate the on/off valve means of the nozzle 22, or at some other appropriate point in the system, so that the operation can be carried out on a self-serve basis where it is desirable for the customers to dispense their own windshield washer fluid using the apparatus and methods of the present invention.

This modification is illustrated in FIG. 4. A control system in the upper housing 20 is indicated in dotted outline at 60. This control system can retain the relays and other controls previously mentioned. Associated with the control system is a coin mechanism 61. Coins can be inserted, as at slots 62, a coin return being indicated at 63. The coin mechanism can be of conventional form and permits operation of the dispensing apparatus, via the control system, when the necessary coins have been inserted in the coin mechanism to dispense a determined quantity of liquid. Secondly, as so far described, when liquid flow occurs from the reservoir, it continues until the reservoir is empty. However, it can be arranged that, instead of the determined amount being the whole content of the reservoir, other determined quantities of lesser volume can be dispensed.

Figure 5:
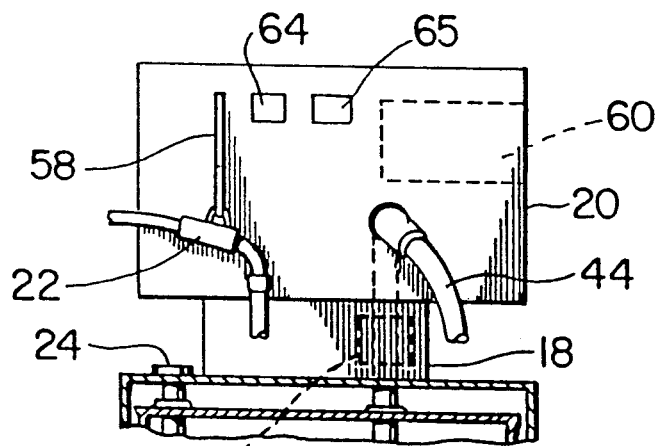
FIG. 5 is a view similar to that of FIG. 4, illustrating a further modification.
Figure 6:
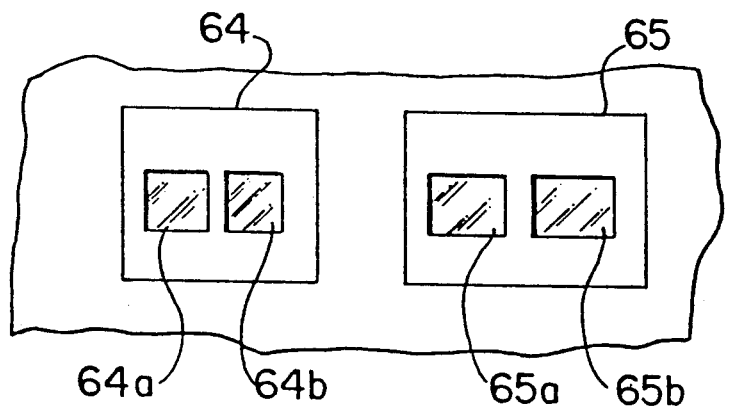
FIG. 6 is an enlarged, partial view of the upper portion of the front face of the apparatus shown in FIG. 5.

Illustrated in FIGS. 5 and 6 is a further modification in which displays 64 and 65 are provided in the top housing. A flow sensor is positioned in the supply pipe line from the reservoir 30 to the hose 44. One possible position is indicated in dotted outline at 66. Display 64 will display, for example, litres at 64a and tenths of a litre at 64b. At display 65, dollars can be shown at 65a and units at 65b. With the arrangements shown in FIGS. 5 and 6, it may be that the quantity — either by volume or by cash — which is dispensed, will not empty the reservoir. The switch 34 will then not actuate the pump 56 to re-fill the reservoir. A manually operated switch, for example, a push-button switch, can be provided at some convenient position on the top housing 20. Situation of this switch by-passes switch 34 and the pump 56 fills the reservoir. An alternative arrangement is for a switch to be actuated on replacement of the nozzle 22 on lever 58.

It can also be arranged that the coin mechanism 61, in FIG. 4, can be one that will accept varying total values of coins, starting off the dispensing of liquid once the inserted value has been reached.

I claim:

1. A self-contained liquid dispensing apparatus comprising:
   a housing;
   a bulk tank in said housing for holding a bulk supply of liquid;
   a reservoir mounted on said housing for holding a smaller supply of liquid;
   a first pump in said housing and means connecting said first pump to said reservoir, for filling said reservoir from said bulk tank;
   a second pump in said housing and means connecting said second pump to a dispensing outlet, for pumping liquid from said reservoir to said dispensing outlet;
   liquid level sensing means associated with said reservoir and including an upper sending means and a lower sensing means for sensing a higher and a lower liquid level in said reservoir; and
   control means for actuating said first and second pumps;
   said lower and said upper sensing means respectively providing signals to said control means to actuate said first pump to fill said reservoir when said liquid level is at said lower liquid level and to permit actuation of said second pump for dispensing of said liquid to said dispensing outlet after filling of said reservoir.

2. An apparatus as defined in claim 1, wherein the dispensing outlet includes nozzle means for dispensing the liquid from the reservoir.

3. An apparatus as defined in claim 2, wherein the nozzle means includes on/off valve means.

4. An apparatus as defined in claim 2, wherein there is provided second control means for overall control of both of the pump means, the second control means being actuatable when the nozzle means is moved from a first, non-dispensing position to a second, dispensing position.

5. An apparatus as defined in claim 1, wherein the reservoir is mounted at least partially within the bulk tank.

6. An apparatus as defined in claim 1, wherein the pump means associated with the bulk tank is mounted within the bulk tank.

7. An apparatus as defined in claim 1, wherein the liquid level sensing means within the reservoir is adjustable to vary the amount of fluid in the reservoir.

8. An apparatus as defined in claim 1, wherein the liquid level sensing means within the reservoir comprises first and second spaced-apart detecting means within the reservoir, the first and second detecting means being spaced a distance corresponding to a predetermined amount of fluid.

9. An apparatus as defined in claim 1, said control means comprising a first control means for actuating said pumps and including a second control means for sequential operation of said pumps, independently of said first control means, and including coin-operated means for actuating said second control means.

10. A liquid dispensing apparatus comprising: a bulk tank for holding a bulk supply of liquid; a reservoir positioned in said bulk tank for holding a smaller supply of said liquid; first pump means in said bulk tank for filling said reservoir from said bulk tank; second pump means for pumping liquid from said reservoir to a dispensing outlet; liquid level sensing means associated with said reservoir and including an upper sensing means and a lower sensing means for sensing a higher and a lower liquid level in said reservoir; and control means for actuating said first and second pump means; said lower and said upper sensing means respectively providing signals to said control means to actuate said first pump means and to cease filling said reservoir when said liquid level is at said upper liquid level, said control means permitting actuation of said second pump means for dispensing of said liquid through a flow line to said dispensing outlet after filling of said reservoir.

11. An apparatus as claimed in claim 10, said dispensing outlet comprising a nozzle.

12. An apparatus as defined in claim 11, including coin-operated means associated with said control means, for controlling actuation of said second pump to dispense a quantity of liquid determined by said coin-operated means.

13. An apparatus as defined in claim 12, said coin-operated means having a preset coin value actuating level for dispensing said determined quantity of liquid.

14. An apparatus as defined in claim 11, including a flow sensor in said flow line, and a liquid quantity indicator connected to said flow sensor for indicating the quantity of liquid dispensed.

15. An apparatus as defined in claim 12, said coin-operated means having a variable coin value level, the coin-operated means being associated with said control means to shut off said second pump when a quantity of liquid determined by an inserted coin value has been dispensed.

16. An apparatus as defined in claim 12, including a flow sensor in said flow line, and a liquid value indicator connected to said flow sensor for indicating the value of liquid dispensed.

17. An apparatus as defined in claim 16, including a flow sensor in said flow line, and a liquid quantity indicator connected to said flow sensor for indicating the quantity of liquid dispensed.

18. An apparatus as claimed in claim 17, wherein said nozzle means includes shut off means.

19. A liquid dispensing apparatus comprising: a bulk tank for holding a bulk supply of liquid; a reservoir for holding a smaller supply of said liquid; first pump means for filling said reservoir from said bulk tank; further pump means for pumping liquid from said reservoir to a dispensing outlet; liquid level sensing means associated with said reservoir and including an upper sensing means and a lower sensing means for sensing a higher and a lower liquid level in said reservoir; control means for actuating said pumps; said lower and said upper sensing means respectively providing signals to said control means to actuate said first pump means to fill said reservoir when said liquid level is at said lower liquid level and to cease filling said reservoir when said liquid level is at said upper liquid level, said control means also actuating said further pump means to permit dispensing of said liquid to said dispensing outlet after filling of said reservoir; and switch means connected to said control means for by-passing said lower sensing means to enable said pump means to re-fill said reservoir when the quantity of liquid dispensed does not lower the liquid level to said lower liquid level.

20. An apparatus as claimed in claim 19, said switch means comprising a manually operated switch means.

21. An apparatus as claimed in claim 19, said switch means being actuated by the return of said nozzle means to a shut off position.

22. A method of dispensing bulk liquid from a bulk source, comprising:
pumping a liquid from a bulk storage by a first mounted in said bulk storage to a reservoir mounted on said bulk storage for holding a smaller supply of liquid;
feeding said liquid from said reservoir by a second pump mounted in said reservoir;
initiating said pumping by said first pump by detection of a liquid level at a lower level and shutting off said pumping by said first pump by detection of the liquid level at an upper level, and actuating said second pump to pump liquid from said reservoir to an outlet, after filling said reservoir.

23. The method of claim 22, including dispensing said liquid through a nozzle.

24. The method of claim 22, including selecting a determined quantity of liquid by inserting one or more coins in a coin mechanism.

25. The method of claim 22, including indicating the quantity of liquid dispensed.

26. The method of claim 22, including indicating the value of liquid dispensed.

27. A liquid dispensing apparatus comprising: a bulk tank for holding a bulk supply of liquid; a reservoir positioned on said bulk tank for holding a smaller supply of said liquid; first pump means for filling said reservoir from said bulk tank; second pump means for pumping liquid from said reservoir to a dispensing outlet; liquid level sensing means associated with said reservoir and including an upper sensing means and a lower sensing means for sensing a higher and a lower liquid level in said reservoir; control means for actuating said first and second pump means; said lower and said upper sensing means respectively providing signals to said control means to actuate said first pump means to fill said reservoir when said liquid level is at said lower liquid level and to actuate said second pump means to cease filling said reservoir when said liquid level is at said upper liquid level, said control means permitting actuation of said second pump means for dispensing of said liquid to said dispensing outlet after filling of said reservoir.

28. A liquid dispensing apparatus comprising: a bulk tank for holding a bulk supply of liquid; a reservoir positioned on said bulk tank for holding a smaller supply of said liquid; first pump means in said bulk tank for filling said reservoir from said bulk tank; second pump means positioned in said reservoir for pumping liquid from said reservoir to a dispensing outlet; liquid level sensing means associated with said reservoir and including an upper sensing means and a lower sensing means for sensing a higher and a lower liquid level in said reservoir; control means for actuating said first and second pump means; said lower and said upper sensing means respectively providing signals to said control means to actuate said first pump means to fill said reservoir when said liquid level is at said lower liquid level and to actuate said first pump means to cease filling said reservoir when said liquid level is at said upper liquid level, said control means permitting actuation of said second pump means for dispensing of said liquid to said dispensing outlet after filling of said reservoir.

* * * * *